Dec. 2, 1924.
A. BROWN
1,517,823
TRACTOR PLANTER
Filed March 17, 1922      2 Sheets-Sheet 2
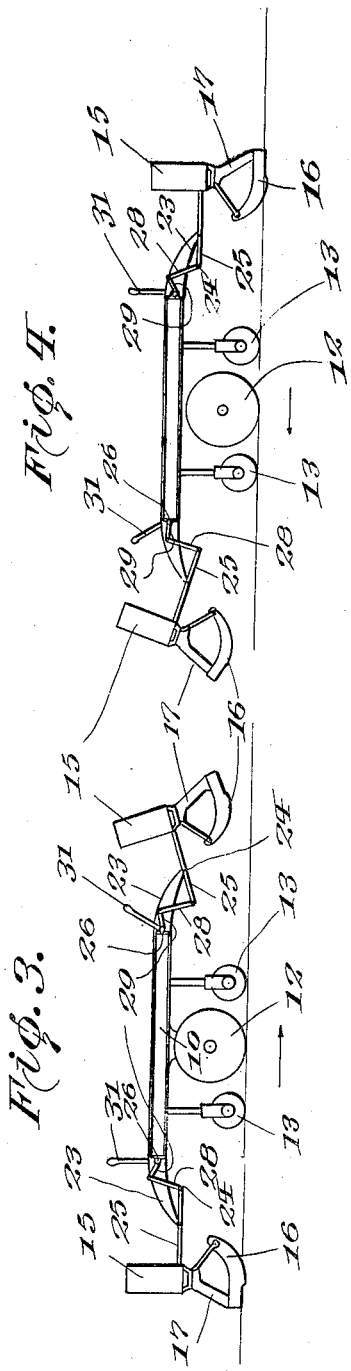
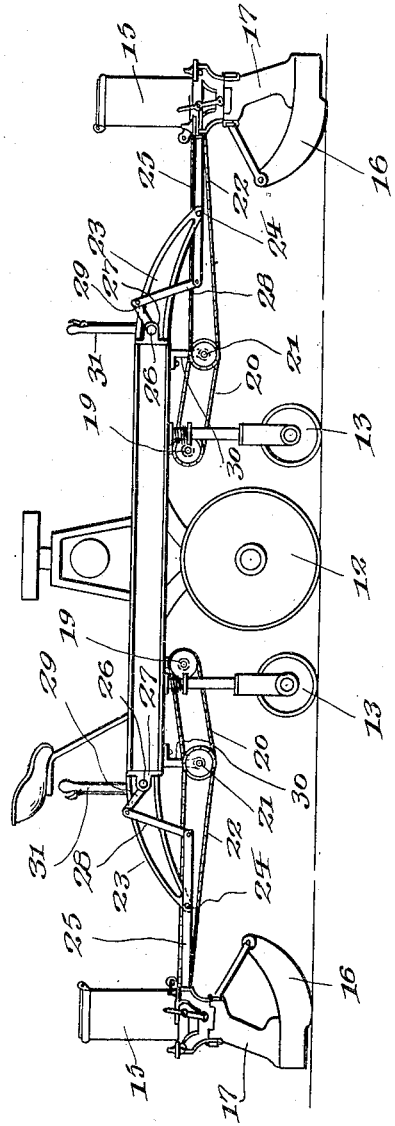
Inventor.
Alvin Brown.
By
Attorneys.

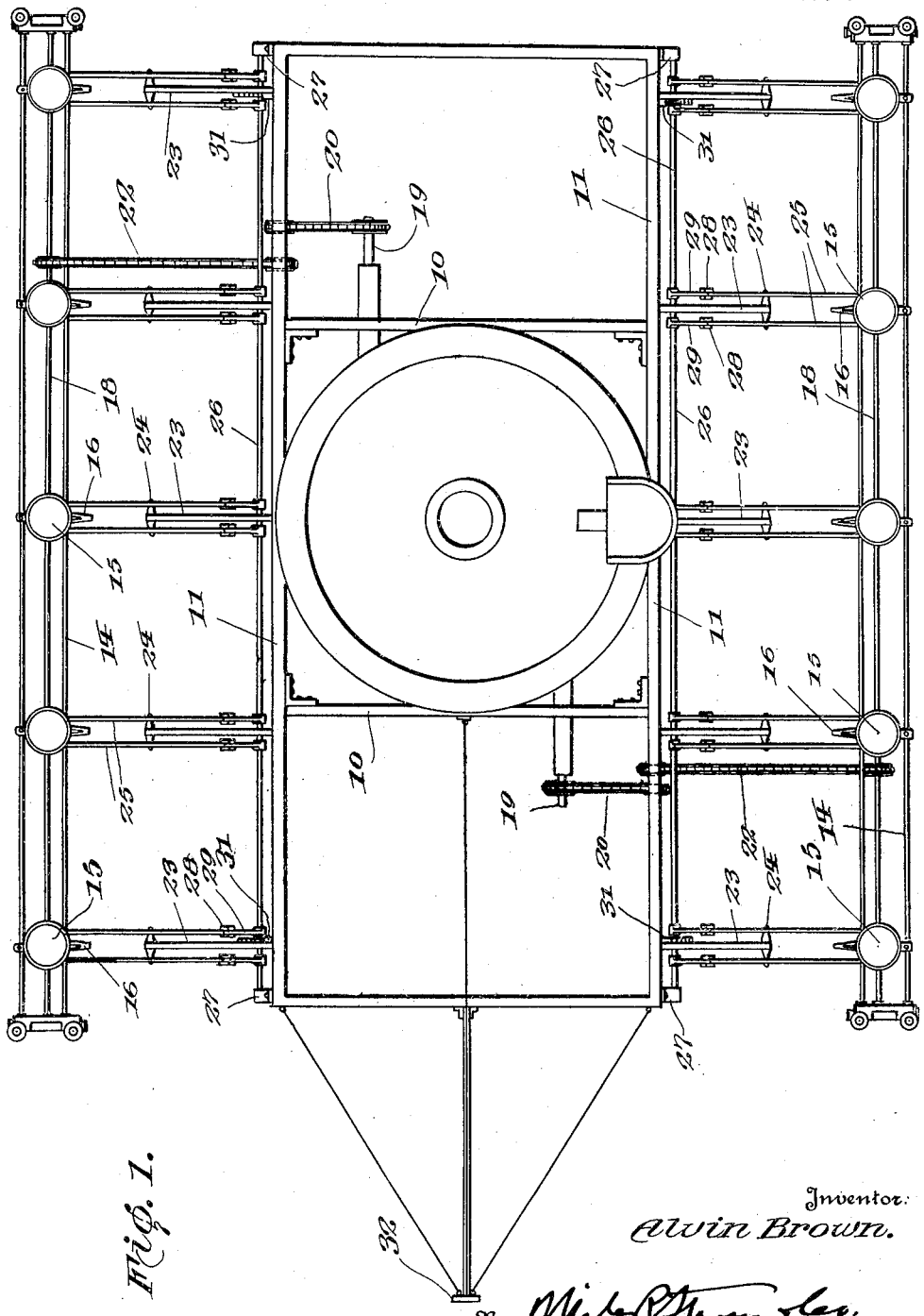

Patented Dec. 2, 1924.

1,517,823

UNITED STATES PATENT OFFICE.

ALVIN BROWN, OF PLAINFIELD, ILLINOIS.

TRACTOR PLANTER.

Application filed March 17, 1922. Serial No. 544,669.

*To all whom it may concern:*

Be it known that I, ALVIN BROWN, a citizen of the United States, residing at Plainfield, in the county of Will and State of Illinois, have invented new and useful Improvements in Tractor Planters, of which the following is a specification.

This invention relates to seed planting machines, and its object is to provide a novel and improved tractor-operated machine of this kind having two sets of planting elements, one set being located at one end of the tractor, and the other set at the opposite end, and either set being adjustable at will to operating position according to the direction of travel of the tractor.

The object stated is attained by means of a combination and arrangement of parts to be hereinafter described and claimed, and in order that the same may be better understood, reference is had to the accompanying drawings, wherein:

Figure 1 is a plan view of the machine.

Figure 2 is a side elevation of the same.

Figures 3 and 4 are diagrams illustrating the various positions occupied by the various parts of the machine.

In the drawing the numerals 10 and 11 designate the side and end cross bars respectively of a tractor. The tractor employed is preferably of the type illustrated in my U. S. Patent No. 1,222,260, issued April 10, 1917. Figure 2 illustrates that the tractor is mounted upon traction wheels 12 and front and rear caster wheels 13.

The frame 14 forming a part of this invention carries seed hoppers 15, furrow openers 16, seed-conducting boots 17 and other well-known parts of an ordinary check-row machine. The seeder shaft 18 is driven by the tractor, the power plant of the later driving a shaft 19 connected by a sprocket-and-chain gearing 20 to a countershaft 21, which latter is connected by a sprocket-and-chain gearing 22 to the shaft 18.

Each end bar 11 of the tractor frame is provided with means for supporting the respective planter units. These supporting means comprise the following parts:

On the end bar 11 are secured outwardly extending bracket arms 23, each having pivoted to its extremity, as shown at 24, a pair of beams 25 supporting at their outer ends the planter frame 14, and having at their inner ends a connection with a rock shaft 26 supported by bearings 27 on the frame bar 11, said connection being a link 28 attached at one end to the beam and at its other end to a rocker arm 29 on the shaft 26. The frame bar 11 also carries bearings 30 which support the countershaft 21. The shaft 26 is equipped with one or more hand levers 31 whereby it may be rocked, said levers being provided with the customary locking means.

By the planter supporting means hereinbefore described, the planter unit can be elevated clear of the ground, this being done by operating the hand levers 31 to rock the shaft 26, whereupon, through the connections 28 and 29, the beam 25 is tilted vertically, and the planter frame 14 is elevated. Upon swinging the hand levers 31 in the opposite direction, the beam 25 is tilted in a direction to lower the planter unit to operative position. Both planter units are controlled in this manner, and hence either unit may be placed in operative or inoperative position.

Figs. 3 and 4 illustrate the manner in which the machine is operated. In Fig. 3 the machine is assumed to be traveling to the right as indicated by the arrow, and the planter unit to the rear is down in operative position, whereas the planter unit in front has been elevated to inoperative position. In Fig. 4 the position of the planter units are shown reversed, the machine now traveling to the left as indicated by the arrow.

It will be evident that when the machine, with the planter units arranged as shown in Fig. 3, reaches the end of the field, there will be left a portion of the field unplanted, this being the distance between the rear and front units. But if now, the front unit is let down, and the rear unit elevated, and the tractor is reversed, that portion of the field from the end thereof to the point where the rear unit ceased to operate, will be planted. The machine is now made to travel laterally for its next trip to the other end of the field, but before starting on this trip, it is run back to the end of the field just planted, with both units up, and upon reaching this end, the unit which is now at the end of the field is let down as shown in Fig. 4, and the return trip across the field is made, the planting starting at the extreme end of the field. The machine is operated in this manner at each end of the field, and hence it will be evident that the field is planted close to each end so that there will be no end portions left unplanted.

The machine is also equipped with a marker 32, and various other parts usually employed in connection with check-row-planters, but as these are well-known, they need not be illustrated or described.

I claim:

A machine of the class described comprising a frame having its opposite ends formed with longitudinally extending spaced parallel downwardly curved bracket arms, pairs of spaced beams fulcrumed intermediate their ends on the outer ends of said bracket arms, planting units carried by the outer portions of said pairs of beams, links connected to the inner ends of said beams, adjusting shafts carried by opposite ends of said frame and having cranks connected to the inner ends of said links, and hand operated levers connected to said adjusting shafts and adapted to be operated for raising and lowering said planters.

In testimony whereof I affix my signature.

ALVIN BROWN.